United States Patent
Lin et al.

(10) Patent No.: US 7,543,358 B2
(45) Date of Patent: Jun. 9, 2009

(54) MULTI-STAGE HINGE ASSEMBLY AND ELECTRICAL DEVICE

(75) Inventors: San-Feng Lin, Sinjhuang (TW); Yi-Chuan Li, Taipei (TW)

(73) Assignee: Asustek Computer Inc., Taipei (TW)

( * ) Notice: Subject to any disclaimer, the term of this patent is extended or adjusted under 35 U.S.C. 154(b) by 485 days.

(21) Appl. No.: 11/053,858

(22) Filed: Feb. 10, 2005

(65) Prior Publication Data
US 2005/0204509 A1 Sep. 22, 2005

(30) Foreign Application Priority Data
Mar. 19, 2004 (TW) ............... 93107594 A (51) Int. Cl.
*E05D 11/08* (2006.01)
(52) U.S. Cl. ............... 16/342; 16/319; 16/337
(58) Field of Classification Search ........... 16/342, 16/337, 347, 348, 360, 377, 340, 303, 341, 16/386; 361/680–683; 379/428.01, 433.13; 455/90.3, 575.1
See application file for complete search history.

(56) References Cited
U.S. PATENT DOCUMENTS

| | | | | |
|---|---|---|---|---|
| 4,788,746 A * | 12/1988 | Idler | ............ | 16/297 |
| 5,040,268 A * | 8/1991 | Knurr | ............ | 16/285 |
| 5,455,989 A * | 10/1995 | Roy | ............ | 16/376 |
| 5,669,107 A * | 9/1997 | Carlsen et al. | ............ | 16/348 |
| 5,943,738 A * | 8/1999 | Karfiol | ............ | 16/342 |
| 6,433,938 B1 * | 8/2002 | Kawamura | ............ | 359/687 |
| 6,473,938 B1 * | 11/2002 | Yoshigashima et al. | ....... | 16/342 |
| 6,513,197 B2 * | 2/2003 | Rude et al. | ............ | 16/342 |
| 6,588,062 B2 * | 7/2003 | Novin et al. | ............ | 16/342 |
| 6,647,593 B2 * | 11/2003 | Iguchi et al. | ............ | 16/386 |
| 6,868,582 B2 * | 3/2005 | Lu et al. | ............ | 16/342 |
| 7,051,404 B2 * | 5/2006 | Roy | ............ | 16/355 |
| 7,140,074 B2 * | 11/2006 | Han et al. | ............ | 16/366 |
| 7,334,297 B2 * | 2/2008 | Ma et al. | ............ | 16/303 |
| 2003/0126719 A1 * | 7/2003 | Chen | ............ | 16/342 |
| 2003/0221290 A1 * | 12/2003 | Lu | ............ | 16/342 |
| 2004/0226140 A1 * | 11/2004 | Lu et al. | ............ | 16/342 |
| 2005/0273977 A1 * | 12/2005 | Lu et al. | ............ | 16/330 |

\* cited by examiner

*Primary Examiner*—Robert J Sandy
*Assistant Examiner*—Ruth C Rodriguez
(74) *Attorney, Agent, or Firm*—Birch, Stewart, Kolasch & Birch, LLP (57) ABSTRACT

A multi-stage hinge assembly connected between first and second shell portions includes a first component, a second component and a connecting portion. At least one part of the first component is fixed to the first shell portion. A pivot extends from one side of the first component along a rotating axis. A protrusion is disposed on the pivot. At least one part of the second component is fixed to the second shell portion. The connecting portion is disposed beside the second component and pivots on the pivot. When the first component rotates relative to the second component, the pivot or connecting portion rotates about the rotating axis. First and second trenches are disposed in the connecting portion and separate it into first and second connecting portions. The first and second trenches are connected together and have different widths. The protrusion slides in the first or second trench.

18 Claims, 5 Drawing Sheets

MULTI-STAGE HINGE ASSEMBLY AND ELECTRICAL DEVICE

BACKGROUND OF THE INVENTION

1. Field of Invention

The invention relates to a hinge assembly and an electrical device, and more particularly to a multi-stage hinge assembly having a multi-stage hinge structure for automatically locking a notebook computer, and an electrical device using the hinge assembly.

2. Related Art

Notebook computers have been widely used among the current information products because they have the main advantage of good mobility and capable of being carried by the user to anywhere according to the requirements. In the highly developed and advanced information technology, a notebook computer may serve as a mobile workstation capable of enabling the network information acquisition and transmission and the database management. So, the notebook computer is the best choice for implementing the mobile office. In addition to the consideration of the software pack, the notebook computer still has to take the human-oriented operations into important considerations, such as the interface connection convenience, weight, and operation convenience.

Figure 1:
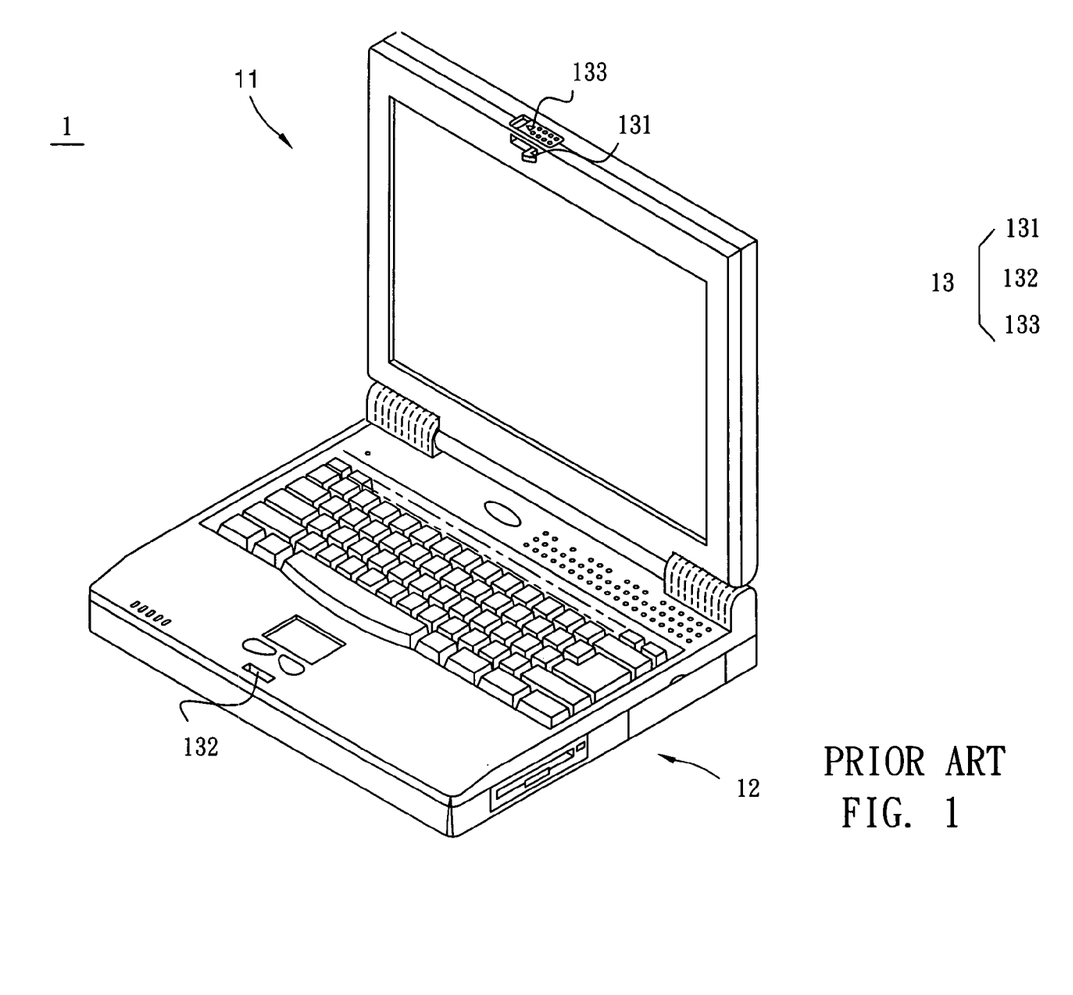
FIG. 1 is a schematic illustration showing a conventional locking assembly.

The notebook computer is mainly composed of a host and a liquid crystal display, which has to be opened during the usage, and the notebook computer can be operated using the keyboard on the host base or the connected mouse. After being used, the liquid crystal display has to be closed to facilitate the storage and portability. In order to prevent the liquid crystal display from being unintentionally opened and thus damaged after the computer is closed, a locking assembly is attached to the host base and the liquid crystal display to lock the notebook computer. As shown in FIG. 1, the conventional electrical device 1 has a liquid crystal display 11, a host 12 and a locking assembly 13. The locking assembly 13 includes a hook 131, a slot 132 and a push button 133. When the liquid crystal display 11 and the host 12 are to be closed and locked, the hook 131 disposed on liquid crystal display 11 is used to hook the slot 132 on the host 12. Consequently, the closed liquid crystal display 11 and host 12 can be fixed, the keys disposed on the host 12 and the monitor of the liquid crystal display 11 are protected, and the notebook computer can be conveniently carried. When the notebook computer is to be opened, the push button 133 connected to the hook 131 has to be actuated in order to eliminate the locking state of the locking assembly 13. So, each of the hook 131 and the push button 133 uses a resilient member to facilitate the locking and unlocking operations.

However, the locking assembly 13 of the above-mentioned notebook computer utilizes the hook 131 on the liquid crystal display 11 to lock into the slot 132 of the host 12. So, the locking assembly 13 cannot automatically lock during the closing operation, and the user has to press down the liquid crystal display 11 to help the hook 131 on the liquid crystal display 11 to smoothly hook the slot 132. If the user unintentionally provides a too-large force, the hook 131 tends to be damaged and thus influences the operation of the locking assembly 13. Sometimes, if the closing force is too large, the side frame of the liquid crystal display 11 may be damaged. In addition, from the design point of view, most of the locking assemblies 13 are exposed from the liquid crystal display 11 or the host 12, and thus influence the glory and tend to cause the deformation or fracture of the locking assembly 13.

It is therefore a subjective of the invention to provide a multi-stage hinge assembly and an electrical device, which can solve the above-mentioned problems.

SUMMARY OF THE INVENTION

In view of the foregoing, the invention is to provide a multi-stage hinge for automatically locking a notebook computer and an electrical device using the multi-stage hinge.

To achieve the above, a multi-stage hinge assembly of the invention, which is connected between a first shell portion and a second shell portion, includes a first component, a second component and a connecting portion. At least one part of the first component is fixed to the first shell portion. A pivot extends from one side of the first component along a rotating axis. A protrusion is disposed on the pivot. At least one part of the second component is fixed to the second shell portion. The connecting portion is disposed beside the second component and pivots on the pivot. When the first component rotates relative to the second component, the pivot and the connecting portion rotate along the rotating axis relatively. A first trench and a second trench are disposed in the connecting portion to separate the connecting portion into a first connecting portion and a second connecting portion. The first trench and the second trench are connected each other and respectively have different widths. The protrusion slides in the first trench or second trench.

To achieve the above, an electrical device of the invention includes a first shell portion, a second shell portion, a first component, a second component and a connecting portion. In this case, at least one part of the first component is fixed to the first shell portion. A pivot extends from one side of the first component along a rotating axis. A protrusion is disposed on the pivot. At least one part of the second component is fixed to the second shell portion. The connecting portion is disposed beside the second component and pivots on the pivot. When the first component rotates relative to the second component, the pivot and the connecting portion rotate along the rotating axis relatively. A first trench and a second trench are disposed in the connecting portion to separate the connecting portion into a first connecting portion and a second connecting portion. The first trench and the second trench are connected each other and respectively have different widths. The protrusion slides in the first trench or second trench.

As mentioned above, each of the multi-stage hinge assembly and the electrical device of the invention has a first trench and a second trench such that a protrusion disposed on a pivot can enter the second trench from the first trench, which is in an opened state, after the user applies forces thereon. Then, a first shell portion and a second shell portion can be in a closed state. Compared to the prior art, the multi-stage hinge assembly and the electrical device of the invention utilize the hinge structure to quickly and automatically lock the first shell portion on the second shell portion during the final closing process. So, the conventional hook structure can be omitted, and there is no condition that the hook is deformed or broken owing to the improperly applied force. Moreover, the hidden hinge design enhances the visual glory. In addition, in the embodiment of the invention, the first connecting portion or second connecting portion may further include a first bevel, which can increase the frictional force between the protrusion and the first connecting portion and the second connecting portion and thus reduce the force, which is applied by the user to close the first shell portion and the second shell portion. So, it is possible to prevent the first shell portion and the second shell portion from colliding and being damaged owing to the high closing speed. Furthermore, in the embodiment of the invention, the first connecting portion or second connecting portion may further include a second bevel, which can make the protrusion smoothly slide into the second trench during the closing process so that the first shell portion and the second shell portion can be automatically and quickly locked.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
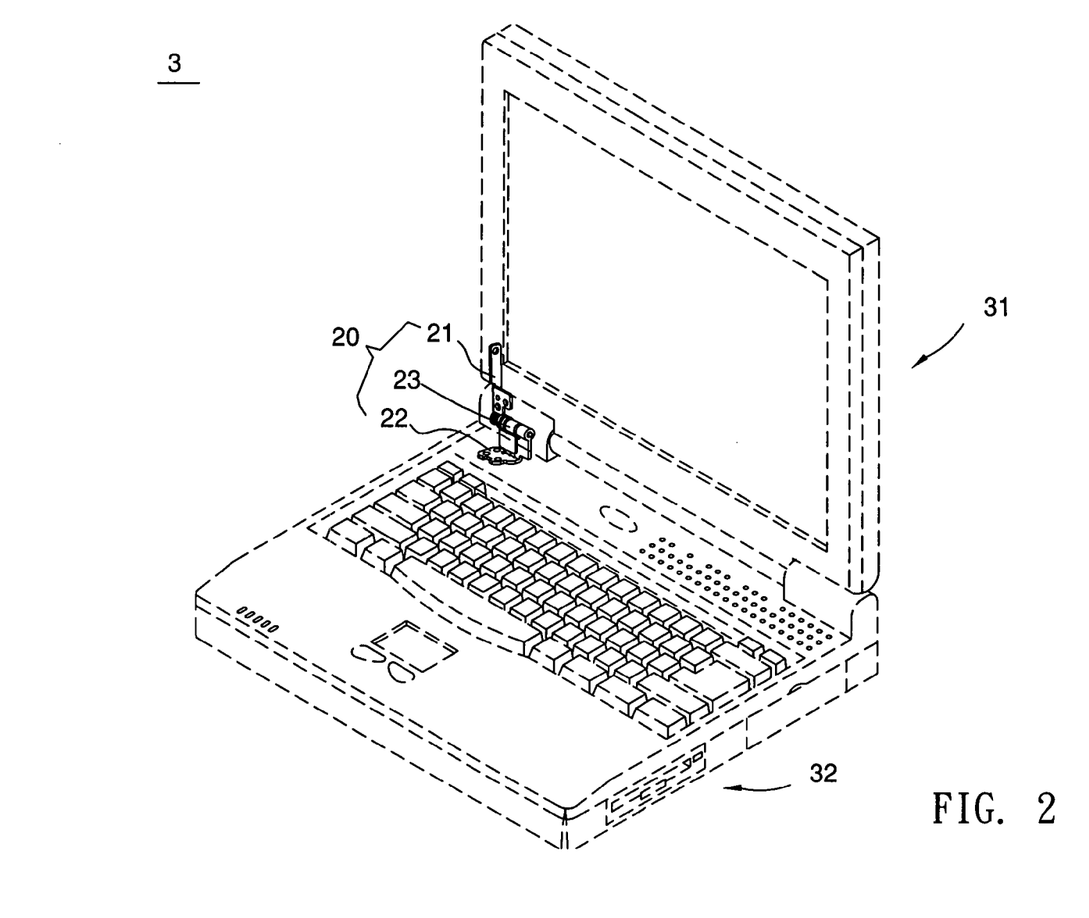
FIG. 2 is a schematic illustration showing a multi-stage hinge assembly and an electrical device of the invention.
Figure 3:
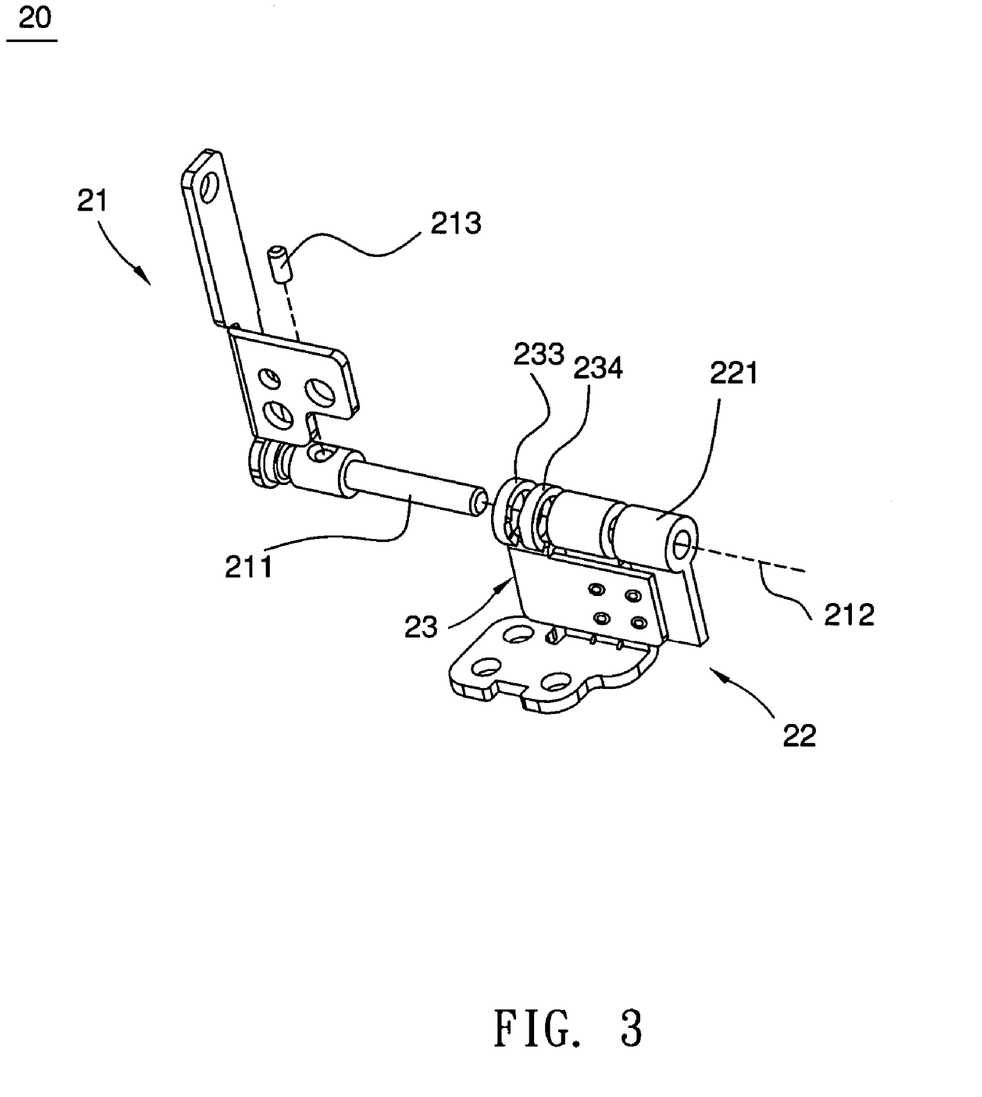
FIG. 3 is an exploded view showing the multi-stage hinge assembly of the invention.
Figure 4:
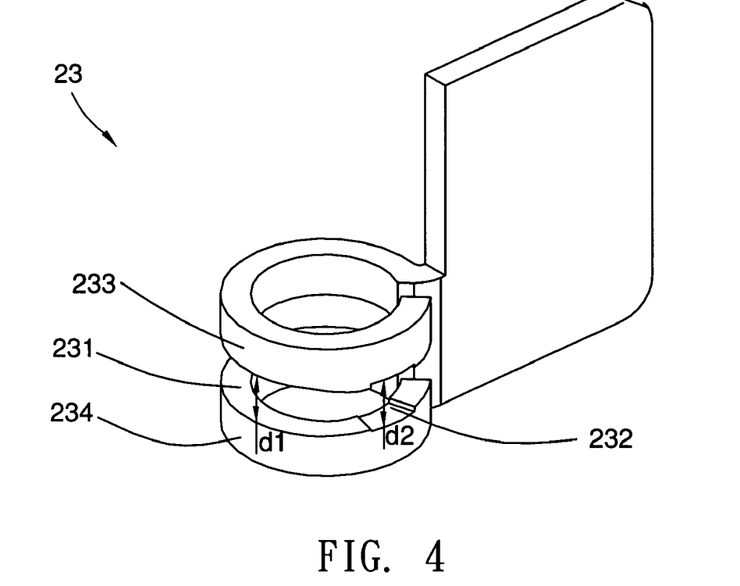
FIG. 4 is a schematic illustration showing a connecting portion of the multi-stage hinge assembly of the invention.

First, please refer to FIG. 2 to FIG. 4 for illustrating a multi-stage hinge assembly according to a first preferred embodiment of the invention.

Referring to FIG. 2, a multi-stage hinge assembly 20 includes a first component 21, a second component 22 and a connecting portion 23. The multi-stage hinge assembly 20 is to be connected between a first shell portion 31 and a second shell portion 32 of an electrical device 3. The electrical device 3 may be a notebook computer, a digital personal assistant (PDA), or any other portable data processing apparatus. In this embodiment, for example, the electrical device 3 is a notebook computer, the first shell portion 31 may be a side frame of a LCD (Liquid Crystal Display) panel, and the second shell portion 32 may be a host shell portion.

As shown in FIG. 2, at least one part of the first component 21 is fixed to the first shell portion 31, and at least one part of the second component 22 is fixed to the second shell portion 32. In this embodiment, a part of the first component 21 is fixed to the side frame of the LCD panel, and a part of the second component 22 is fixed to the host shell portion.

Referring to FIG. 3, a pivot 211 extends from one side of the first component 21 along a rotating axis 212, and a protrusion 213 is disposed on the pivot 211. The protrusion 213 extends along a direction perpendicular to the rotating axis 212 and may be a pin fixed to the pivot 211. Of course, the protrusion 213 and the pivot 211 may be integrally formed.

As shown in FIG. 3, the connecting portion 23 is disposed beside one side of the second component 22, and the pivot 211 is pivoted on the connecting portion 23 such that the pivot 211 or connecting portion 23 rotates about the rotating axis 212 when the first component 21 rotates relative to the second component 22.

As shown in FIGS. 3 and 4, a first trench 231 and a second trench 232 are disposed beside the connecting portion 23 and separate the connecting portion 23 into a first connecting portion 233 and a second connecting portion 234. The first and second connecting portions 233 and 234 provide a fluctuating frictional force between the rotating first component 21 and second component 22. In this embodiment, each of the first connecting portion 233 and the second connecting portion 234 is made of spring steel, and is a ring sleeve surrounding the pivot 211.

Referring to FIGS. 2 and 3, the second component 22 of this embodiment further includes at least one third connecting portion 221, which is connected to the pivot 211 such that a part of the pivot 211 is fixed to the second component 22. When the first shell portion 31 and the second shell portion 32 are opened or closed, the second component 22 can rotate relative to the first component 21. The third connecting portion 221 provides a constant frictional force between the rotating first component 21 and second component 22.

Figure 5:
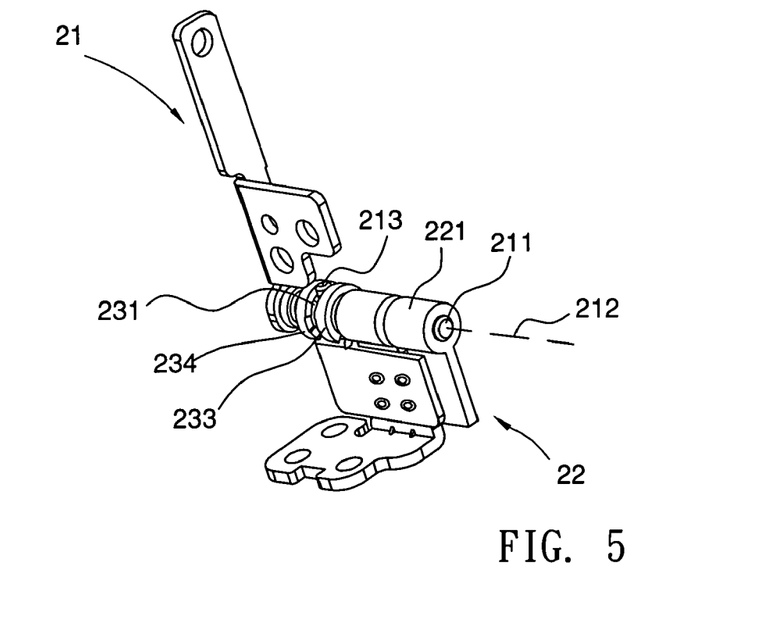
FIG. 5 is a schematic illustration showing that the first shell portion and the second shell portion in the multi-stage hinge assembly of the invention are in an opened state.

As shown in FIGS. 4 and 5, the first trench 231 and the second trench 232 are connected together and have different widths. The first trench 231 has a first gap d1, the second trench 232 has a second gap d2 smaller than the first gap d1, and the protrusion 213 slides in the first trench 231 or second trench 232.

Figure 6:
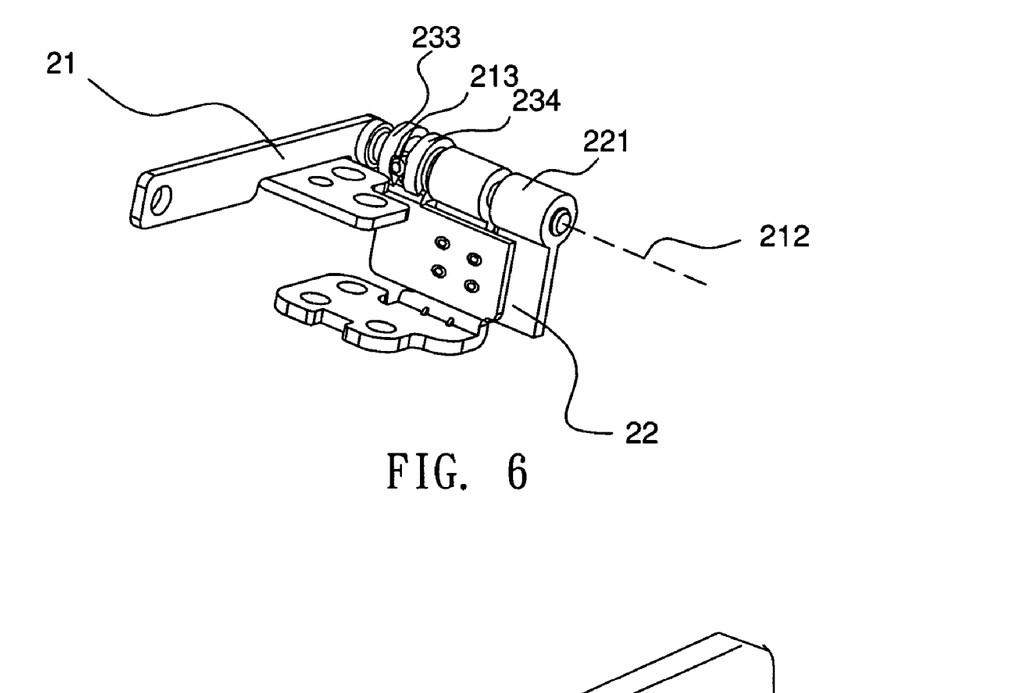
FIG. 6 is a schematic illustration showing that the first shell portion and the second shell portion in the multi-stage hinge assembly of the invention are in a closed state.

With reference to FIGS. 2, 3, 4, and 5, the width of the first trench 231 is smaller than the diameter of the protrusion 213 such that frictional forces exist between the protrusion 213 and the first and second connecting portions 233 and 234 when the protrusion 213 is located in the first trench 231. In addition, as shown in FIGS. 2, 4 and 6, when the user wants to close the first shell portion 31 and the second shell portion 32, he or she has to force the first shell portion 31 and the second shell portion 32 to rotate relative to each other. At this time, the protrusion 213 also rotates relative to the first connecting portion 233 and the second connecting portion 234. When the first shell portion 31 and the second shell portion 32 are to be closed, the protrusion 213 enters the second trench 232. Because the width of the second trench 232 is greater than the diameter of the protrusion 213, the frictional forces between the protrusion 213 and the second and first components 22 and 21 are relatively small. So, the first shell portion 31 and the second shell portion 32 are automatically locked into a closed state rapidly.

Hereinafter, please refer to FIG. 7 for illustrating a multi-stage hinge assembly according to a second preferred embodiment of the invention.

Figure 7:
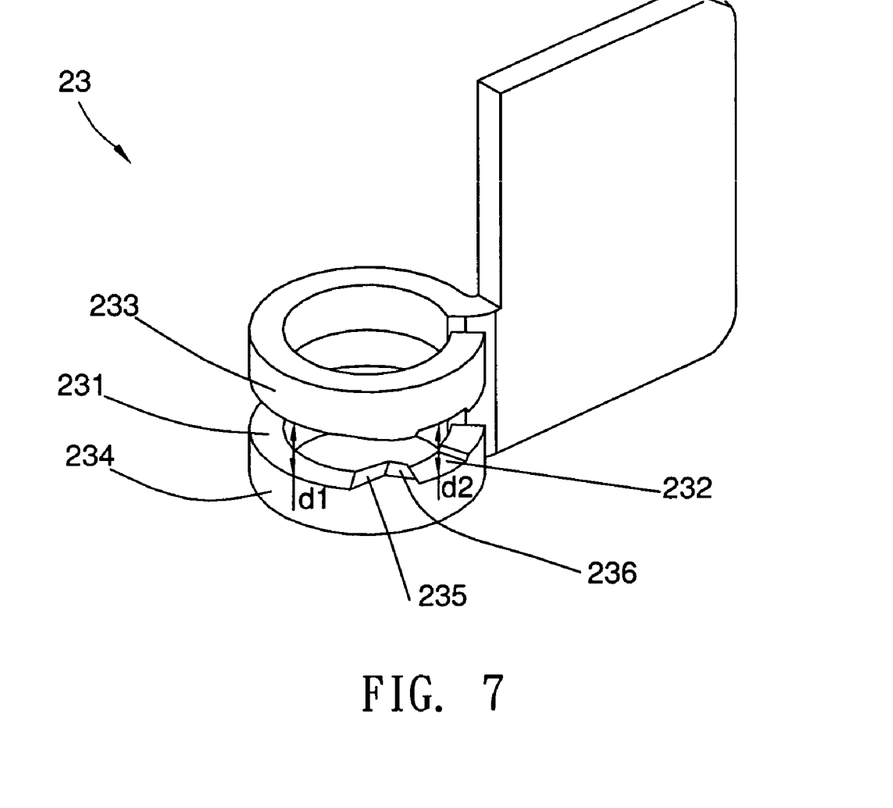
FIG. 7 is another schematic illustration showing another connecting portion of the multi-stage hinge assembly of the invention.

Referring to FIGS. 2 and 7, the first connecting portion 233 or the second connecting portion 234 may further include at least one first bevel 235, which enables the distance between the first connecting portion 233 and the second connecting portion 234 to gradually decrease from the original first gap d1. Thus, when the first shell portion 31 and the second shell portion 32 are forced to close, the protrusion 213 passes through the first bevel 235 from the first trench 231. At this time, the frictional force between the second component 22 and the first component 21 increases. Because the frictional force decreases, the closing speed of the first shell portion 31 and the second shell portion 32 is slowed down. So, it is possible to prevent the first shell portion 31 and the second shell portion 32 from colliding with each other due to the too-high closing speed caused by the user who applies the too-large force. Thereafter, the protrusion 213 again enters the second trench 232 such that the first shell portion 31 and the second shell portion 32 are automatically locked into the closed state.

With reference to FIG. 2 and FIG. 7, the first connecting portion 233 or second connecting portion 234 may further include at least one second bevel 236, which enables the distance between the first connecting portion 233 and the second connecting portion 234 to gradually increase. Thus, when the first shell portion 31 and the second shell portion 32 are forced to close and when the protrusion 213 passes through the first bevel 235 from the first trench 231 and reaches the second bevel 236, the frictional force between the second component 22 and the first component 21 decreases because the distance increases. Because the frictional force suddenly decreases, the protrusion 213 passes through the second bevel 236 rapidly and slides into the second trench 232 such that the second shell portion 32 and the first shell portion 31 are closed rapidly to make the first shell portion 31 and the second shell portion 32 in the closed state.

When the user forces the first shell portion 31 and the second shell portion 32 to close, the protrusion 213 disposed on the pivot 211 first travels to the first bevel 235 from the first trench 231, which is in the opened state, in order to reduce the closing speed, and then to the second bevel 236 such that the protrusion 213 rapidly slides into the second trench 232 due to the reduced frictional force. Thus, the automatic locking operation of the first shell portion 31 and the second shell portion 32 is completed. In addition, when the user wants to open the first shell portion 31 and the second shell portion 32, he or she has to force to push the protrusion 213 sequentially from the second trench 232 through the second bevel 236 and the first bevel 235, and then the protrusion 213 slides into the first trench 231 such that the first shell portion 31 and the second shell portion 32 are in the opened state.

Please refer to FIG. 2 to FIG. 7 for illustrating an electronic apparatus 3 according to a preferred embodiment of the invention.

Referring again to FIG. 2, the electrical device 3 includes a first shell portion 31, a second shell portion 32, a first component 21, a second component 22 and a connecting portion 23.

The electrical device 3 may be a notebook computer, a digital personal assistant (PDA), or any other portable data processing apparatus. In this embodiment, for example, the electrical device 3 is a notebook computer, the first shell portion 31 may be a side frame of a LCD panel, and the second shell portion 32 may be a host shell portion. Of course, the first shell portion 31 also may be a host shell portion, and the second shell portion 32 also may be a side frame of a LCD panel.

As shown in FIG. 2, the multi-stage hinge assembly 20 includes a first component 21, a second component 22 and a connecting portion 23. The multi-stage hinge assembly 20 is to be connected between a first shell portion 31 and a second shell portion 32. At least one part of the first component 21 is fixed to the first shell portion 31, and at least one part of the second component 22 is fixed to the second shell portion 32.

Referring to FIG. 3, a pivot 211 extends from one side of the first component 21 along a rotating axis 212, and a protrusion 213 is disposed on the pivot 211. The protrusion 213 extends along a direction perpendicular to the rotating axis 212 and may be a pin fixed to the pivot 211. Of course, the protrusion 213 and the pivot 211 may be integrally formed.

As shown in FIG. 3, the connecting portion 23 is disposed beside one side of the second component 22, and the pivot 211 is pivoted on the connecting portion 23. Therefore, the pivot 211 or connecting portion 23 rotates about the rotating axis 212 when the first component 21 rotates relative to the second component 22.

A first trench 231 and a second trench 232, as shown in FIG. 4, are disposed beside the connecting portion 23 and separate the connecting portion 23 into a first connecting portion 233 and a second connecting portion 234. The first and second connecting portions 233 and 234 provide a fluctuating frictional force between the rotating first component 21 and second component 22. In this embodiment, each of the first connecting portion 233 and the second connecting portion 234 is made of spring steel, and is a ring sleeve surrounding the pivot 211.

Referring to FIG. 3, the second component 22 of this embodiment further includes at least one third connecting portion 221, which is connected to the pivot 211. When the first shell portion 31 and the second shell portion 32 are opened or closed, part of the second component 22 fixed to the second shell portion 32 can rotate relative to the first component 21. The third connecting portion 221 provides a constant frictional force between the rotating first component 21 and second component 22.

As shown in FIGS. 4 and 5, the first trench 231 and the second trench 232 are connected together and have different widths. The first trench 231 has a first gap d1, the second trench 232 has a second gap d2 smaller than the first gap d1, and the protrusion 213 slides in the first trench 231 or second trench 232.

With reference to FIGS. 2, 3, 4 and 5, the width of the first trench 231 is smaller than the diameter of the protrusion 213 such that frictional forces exist between the protrusion 213 and the first and second connecting portions 233 and 234 when the protrusion 213 is located in the first trench 231. In addition, as shown in FIGS. 2, 4 and 6, when the user wants to close the first shell portion 31 and the second shell portion 32, he or she has to force the first shell portion 31 and the second shell portion 32 to rotate relative to each other. At this time, the protrusion 213 also rotates relative to the first connecting portion 233 and the second connecting portion 234. When the first shell portion 31 and the second shell portion 32 are to be closed, the protrusion 213 enters the second trench 232. Because the width of the second trench 232 is greater than the diameter of the protrusion 213, the frictional forces between the protrusion 213 and the second and first components 22 and 21 are relatively small. So, the first shell portion 31 and the second shell portion 32 are automatically locked into a closed state rapidly.

Referring to FIGS. 2 and 7, the first connecting portion 233 or the second connecting portion 234 may further include at least one first bevel 235, which enables the distance between the first connecting portion 233 and the second connecting portion 234 to gradually decrease from the original first gap d1. Thus, when the first shell portion 31 and the second shell portion 32 are forced to close, the protrusion 213 passes through the first bevel 235 from the first trench 231. At this time, the frictional force between the second component 22 and the first component 21 increases. Because the frictional force decreases, the closing speed of the first shell portion 31 and the second shell portion 32 is slowed down. So, it is possible to prevent the first shell portion 31 and the second shell portion 32 from colliding with each other due to the too-high closing speed caused by the user who applies the too-large force. Thereafter, the protrusion 213 again enters the second trench 232 such that the first shell portion 31 and the second shell portion 32 are automatically locked into the closed state.

With reference to FIG. 2 and FIG. 7, the first connecting portion 233 or second connecting portion 234 may further include at least one second bevel 236, which enables the distance between the first connecting portion 233 and the second connecting portion 234 to gradually increase. Thus, when the first shell portion 31 and the second shell portion 32 are forced to close and when the protrusion 213 passes through the first bevel 235 from the first trench 231 and reaches the second bevel 236, the frictional force between the second component 22 and the first component 21 decreases because the distance increases. Because the frictional force suddenly decreases, the protrusion 213 passes through the second bevel 236 rapidly and slides into the second trench 232 such that the second shell portion 32 and the first shell portion 31 are closed rapidly to make the first shell portion 31 and the second shell portion 32 in the closed state.

To sum up, each of the multi-stage hinge assembly and the electrical device of the invention has a first trench and a second trench such that a protrusion disposed on a pivot can enter the second trench from the first trench, which is in an opened state, after the user applies forces thereon. Then, a first shell portion and a second shell portion can be in a closed state. Compared to the prior art, the multi-stage hinge assembly and the electrical device of the invention utilize the hinge structure to quickly and automatically lock the first shell portion on the second shell portion during the final closing process. So, the conventional hook structure can be omitted, and there is no condition that the hook is deformed or broken owing to the improperly applied force. Moreover, the hidden hinge design enhances the visual glory. In addition, in the embodiment of the invention, the first connecting portion or second connecting portion may further include a first bevel, which can increase the frictional force between the protrusion and the first connecting portion and the second connecting portion and thus reduce the force, which is applied by the user to close the first shell portion and the second shell portion. So, it is possible to prevent the first shell portion and the second shell portion from colliding and being damaged owing to the high closing speed. Furthermore, in the embodiment of the invention, the first connecting portion or second connecting portion may further include a second bevel, which can make the protrusion smoothly slide into the second trench during the closing process so that the first shell portion and the second shell portion can be automatically and quickly locked.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A multi-stage hinge assembly for connecting a first shell portion and a second shell portion, the hinge assembly comprising:
   a first component fixed to the first shell portion, the first component having a pivot extending from one side of the first component along a rotating axis, and a protrusion disposed on the pivot;
   a second component fixed to the second shell portion, the first component rotating relative to the second component; and
   a connecting portion disposed beside the second component and pivoted on the pivot, the first component rotating relative to the second component by rotating the connecting portion around the rotating axis, the connecting portion having a first trench and a second trench that separate the connecting portion into a first connecting portion and a second connecting portion, the first trench and the second trench connecting each other and respectively having different widths, and the protrusion sliding in the first trench or the second trench, each of the first connecting portion and the second connecting portion being a ring sleeve surrounding the pivot,
   wherein the width of the first trench is smaller than a diameter or the protrusion, and the width of the second trench is greater than the diameter of the protrusion such that when the protrusion is located within the first trench, frictional forces exist between the first trench and the protrusion so as to maintain the first shell portion and the second shell portion in an opened state.

2. The multi-stage hinge assembly according to claim 1, wherein the first trench is narrower than the second trench.

3. The multi-stage hinge assembly according to claim 1, wherein the first connecting portion or the second connecting portion further comprises at least one first bevel such that a distance between the second component and the first component gradually decreases and a frictional force between the second component and the first component gradually increases, and the second shell portion and the first shell portion are closed slowly.

4. The multi-stage hinge assembly according to claim 1, wherein the first connecting portion or the second connecting portion further comprises at least one second bevel such that a distance between the second component and the first component gradually increases and a frictional force between the second component and the first component gradually decreases, and the second shell portion and the first shell portion are closed rapidly.

5. The multi-stage hinge assembly according to claim 1, wherein the protrusion extends in a direction perpendicular to the rotating axis.

6. The multi-stage hinge assembly according to claim 1, wherein when the protrusion is in the first trench, frictional forces exist between the protrusion and the second component and the first component so as to maintain the first shell portion and the second shell portion in an opened state.

7. The multi-stage hinge assembly according to claim 1, wherein the protrusion is a pin fixed to the pivot.

8. The multi-stage hinge assembly according to claim 1, wherein the first connecting portion and the second connecting portion are made of spring steel.

9. The multi-stage hinge assembly according to claim 1, wherein the second component further comprises a third connecting portion connected to the pivot to provide a constant frictional force between the first component and the second component, and the first connecting portion and the second connecting portion provide a fluctuating frictional force.

10. An electronic apparatus, comprising:
    a first shell portion;
    a second shell portion pivoted to the first shell portion;
    a first component fixed to the first shell portion, the first component having a pivot extending from one side of the first component along a rotating axis, and a protrusion disposed on the pivot;
    a second component fixed to the second shell portion; and
    a connecting portion disposed beside the second component and pivoted on the pivot, the first component rotating relative to the second component by rotating the connecting portion around the rotating axis, the connecting portion having a first trench and a second trench that separate the connecting portion into a first connecting portion and a second connecting portion, the first trench and the second trench connecting each other and respectively having different widths, and the protrusion sliding in the first trench or the second trench, each of the first connecting portion and the second connecting portion being a ring sleeve surrounding the pivot, wherein the width of the first trench is smaller than a diameter of the protrusion, and the width of the second trench is greater than the diameter of the protrusion such that when the protrusion is located within the first trench, frictional forces exist between the first trench and the protrusion so as to maintain the first shell portion and the second shell portion in an opened state.

11. The electronic apparatus according to claim 10, wherein the first trench is narrower than the second trench.

12. The electronic apparatus according to claim 10, wherein the first connecting portion or the second connecting portion further comprises at least one first bevel such that a distance between the second component and the first component gradually decreases and a frictional force between the second component and the first component gradually increases, and the second shell portion and the first shell portion are closed slowly.

13. The electronic apparatus according to claim 10, wherein the first connecting portion or the second connecting portion further comprises at least one second bevel such that a distance between the second component and the first component gradually increases and a frictional force between the second component and the first component gradually decreases, and the second shell portion and the first shell portion are closed rapidly.

14. The electronic apparatus according to claim 10, wherein the protrusion extends in a direction perpendicular to the rotating axis.

15. The electronic apparatus according to claim 10, wherein when the protrusion is in the first trench, frictional forces exist between the protrusion and the second component and the first component so as to maintain the first shell portion and the second shell portion in an opened state.

16. The electronic apparatus according to claim 10, wherein the protrusion is a pin fixed to the pivot.

17. The electronic apparatus according to claim 10, wherein the first connecting portion and the second connecting portion are made of spring steel.

18. The electronic apparatus according to claim 10, wherein the second component further comprises a third connecting portion connected to the pivot to provide a constant frictional force between the first component and the second component, and the first connecting portion and the second connecting portion provide a fluctuating frictional force.

* * * * *